G. L. AND H. L. B. RYDER.
AUTOMOBILE TOP.
APPLICATION FILED JULY 10, 1915.
1,355,064.
Patented Oct. 5, 1920.
2 SHEETS—SHEET 2.
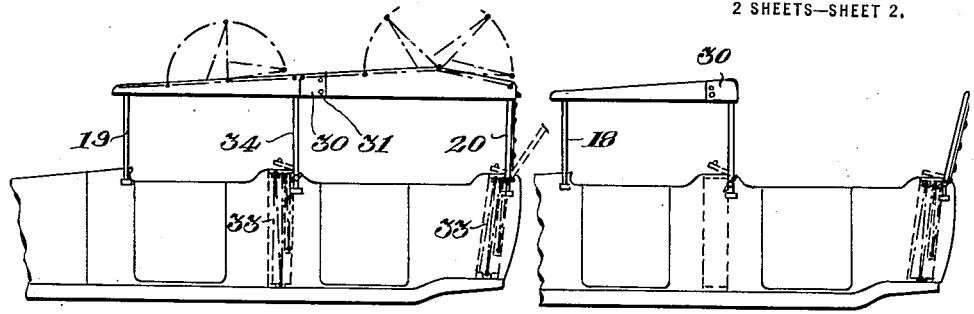
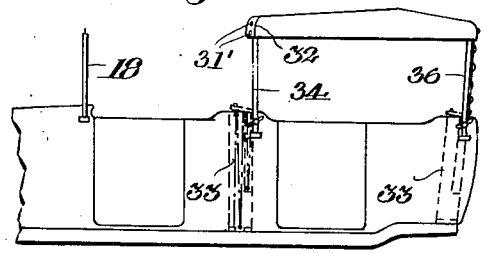
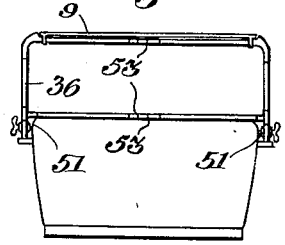
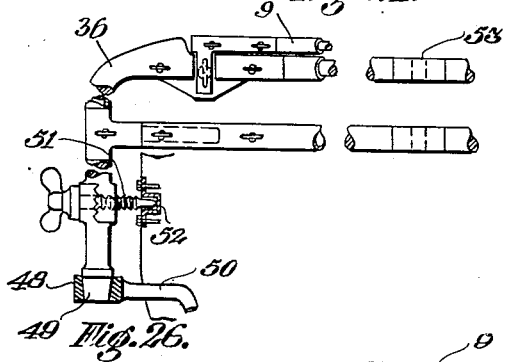
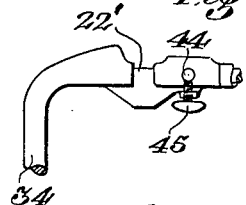
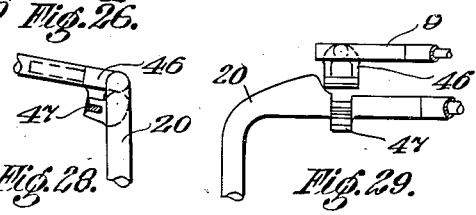
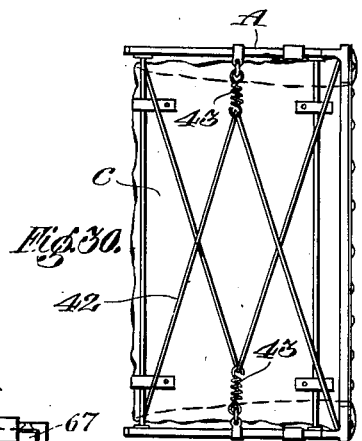

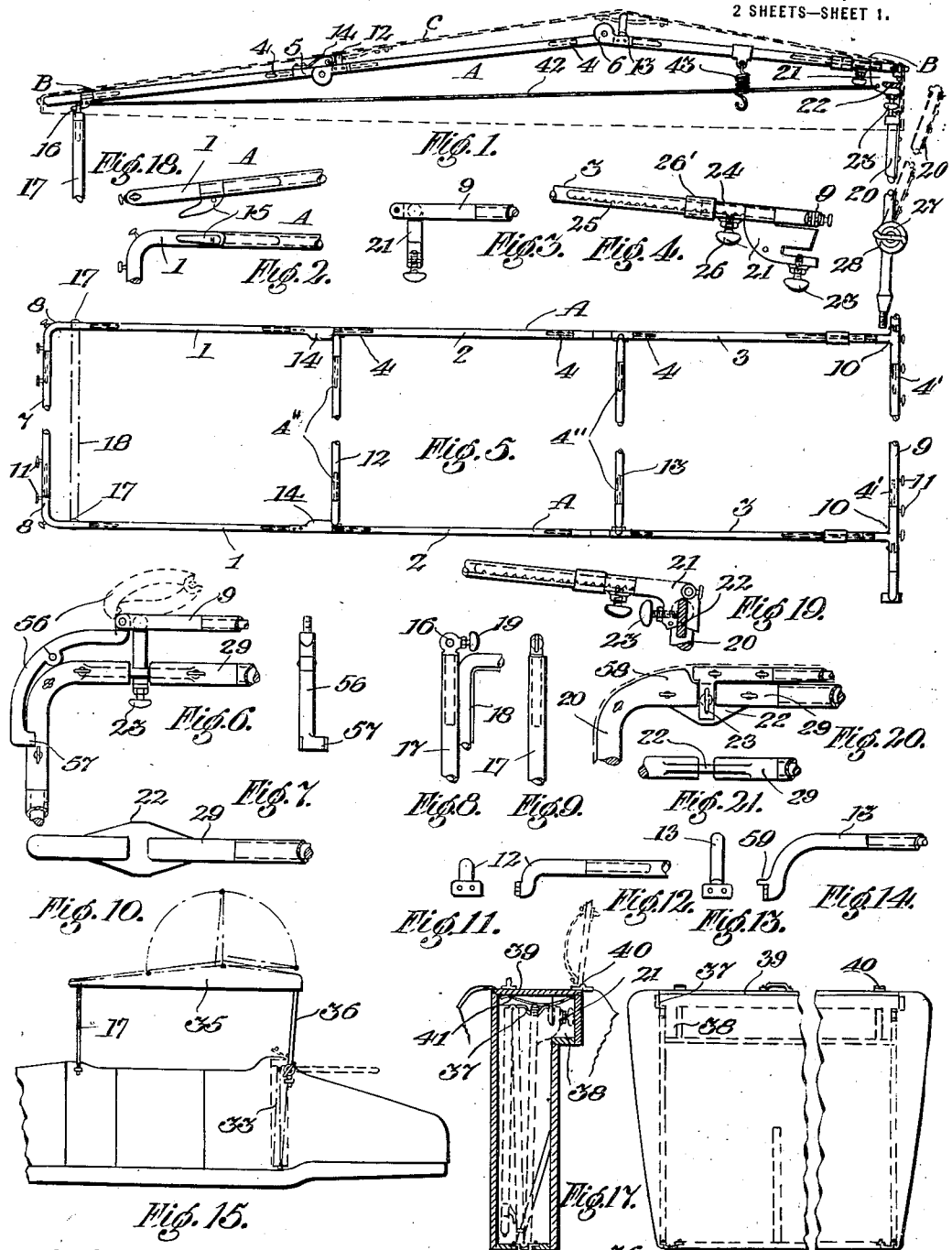

UNITED STATES PATENT OFFICE.

GARFIELD LESLIE RYDER AND HARRY L. B. RYDER, OF POUGHKEEPSIE, NEW YORK.

AUTOMOBILE-TOP.

1,355,064.        Specification of Letters Patent.      Patented Oct. 5, 1920.

Application filed July 10, 1915. Serial No. 39,139.

*To all whom it may concern:*

Be it known that we, GARFIELD LESLIE RYDER and HARRY L. B. RYDER, citizens of the United States, residing at Poughkeepsie, in the county of Dutchess and State of New York, have invented new and useful Improvements in Automobile-Tops, of which the following is a specification.

This invention relates to automobile tops, the broad object of the invention being to produce what may be termed a combination top for automobiles and other vehicles, the construction of which adapts the complete top to be used on bodies of the touring car type so as to cover both the front and rear seats and also to be used on roadster bodies, the construction also admitting of the use of either the front seat covering section or the rear seat covering section of the top as may be found desirable or expedient at the time.

A further object of the invention is to produce a top of the character above referred to which may be handled expeditiously either in the setting up or taking down of the same, provision being made whereby the top may be entirely removed or disconnected from the machine and compactly stored in pockets provided therefor in the machine body. The invention also contemplates the use, as a part of the top supporting means, of rear and intermediate wind or weather shields which are also detachable and adapted to be stored in the body of the car.

With the above and other objects in view, the invention consists in the novel construction, combination and arrangement of parts, herein described, illustrated and claimed.

In the accompanying drawings:—

Figure 1 is a side elevation illustrating the frame of the top together with part of the supporting means therefor and indicating the top cover by dotted lines.

Fig. 2 is a bottom plan view of one of the corner sections of the top frame.

Fig. 3 is a fragmentary rear elevation of one corner of the top frame.

Fig. 4 is a side elevation of the rear portion of the top or stretcher frame.

Fig. 5 is a top plan view of the complete stretcher frame.

Fig. 6 is a fragmentary elevation of one of the rear corner sections of the stretcher frame.

Fig. 7 is an inside face view of one of the stretcher arms.

Figs. 8 and 9 are fragmentary elevations of the front supporting means for the top.

Fig. 10 is a fragmentary plan view of the top of the rear windshield.

Figs. 11 and 12 are end and fragmentary side elevations of one of the cross bars of the stretcher frame.

Figs. 13 and 14 are similar views of another cross bar of the stretcher frame.

Fig. 15 is a diagrammatic side elevation showing the top as applied to a roadster body.

Fig. 16 is an enlarged vertical cross section through one of the pockets in which a section of the top and side curtains are placed when not in use.

Fig. 17 is a rear elevation of the body illustrating by dotted lines the formation of the rear pocket which receives the rear windshield.

Fig. 18 is a side elevation of the same part illustrated in Fig. 2.

Fig. 19 is a side elevation of the rear portion of the stretcher frame, showing a modified arrangement of the cross bar at the top of the rear windshield in cross section.

Fig. 20 is a fragmentary rear elevation showing the connection between the stretcher frame and rear windshield frame.

Fig. 21 is a fragmentary plan view of the top bar of the rear windshield.

Fig. 22 is a diagrammatic side elevation of a touring body supplied with three windshields and showing a sectional top applied thereto and also indicating by dotted lines the pockets for receiving the detached sections of the top.

Fig. 23 is a similar view showing only the front seat covering section of the top in place.

Fig. 24 is a similar view showing only the rear seat covering section of the top in place.

Fig. 25 is a rear elevation of the body showing the rear detachable and foldable windshield.

Fig. 26 is an enlarged fragmentary elevation partly in section illustrating the means for fastening the windshield in place and detaching the same.

Fig. 27 is a fragmentary elevation of one of the upper corners of the intermediate windshield.

Fig. 28 is a fragmentary side elevation of portions of the stretcher frame and rear windshield under a modified arrangement showing the detachable connection between the same.

Fig. 29 is a rear elevation of the parts shown in Fig. 28 with the parts separated.

Fig. 30 is a bottom plan view of a portion of the stretcher frame showing the manner of folding and holding in place the top cover.

Fig. 31 is a fragmentary side view showing a modified form of stretcher frame and rear windshield which are pivotally mounted together.

Fig. 32 is a fragmentary rear view of the same.

Fig. 33 is a fragmentary side view of this form of rear wind shield with the means for supporting it in its pocket.

Fig. 34 is a fragmentary top view of Fig. 33.

The general form and arrangement of the stretcher frame is best illustrated in Fig. 5 wherein it will be observed that said frame comprises the oppositely arranged and substantially parallel side bars, each of which is designated generally at A and is shown as comprising three sections 1, 2 and 3 each preferably in the form of a metal tube of suitable length and having their opposite extremities left open to receive the oppositely projecting pins 4 of a pair of knuckle joint members 5 and 6, the knuckle joint 5 being adapted to open only in an upward direction and the knuckle joint 6 being adapted to open only in a downward direction.

The side bars A are connected at one end by a front cross bar 7 and corner sections or elbows 8 and at their rear ends the bars A are connected by a rear cross bar 9 and elbows 10, the front and rear cross bars being provided with turn or thumb buttons 11 to pass through button holes in the top cover indicated generally at B in Fig. 1.

In addition to the front and rear cross bars 7 and 9 which are also preferably made of tubing and connected to the elbows by pins 4' above referred to, I employ cross bars 12 and 13, each of said bars being somewhat arched as indicated in Fig. 1, the rearmost cross bar 13 being of greater height than the front cross bar 12 and serving to maintain the top cover B out of contact with the stretcher frame. The bars 12 and 13 are sectional and the sections connected by mortise and tenon joints 4''. Adjacent to the knuckle joints 5, spring like protectors 14 are fastened to the top of the side bars A, to prevent the cover B from coming in contact with the joint at that point when the stretcher frame is folded at the joint 5.

Adjacent to the front end of the stretcher frame, the side bars A thereof have fixedly secured thereto hooks or tongues 15 which are insertible through eyes 16 in the side posts 17 of the front windshield, the frame of which is indicated at 18. 19 (Figs. 8 and 9) designates a binding screw for holding the hook or tongue 15 in such position. The stretcher frame is attached to the rear windshield, the frame of which is indicated at 20 as shown in Figs. 1 and 4 by means of slotted clamps 21 adapted to fit over flattened portions 22 of the top cross bar of the windshield frame 20 and to be held in place by means of binding screws 23. The clamps 21 are carried by the rear cross bar 9 of the stretcher frame and each of said clamps is provided with a forwardly extending rod 24 inserted into the rear end of the adjacent side bar section 3 as indicated in Fig. 4 and provided with a rack face 25 which is engaged by a set screw 26 inserted through a sleeve or tubular extension of the side bar section 3, the latter being provided with an enlarged reinforcing collar or sleeve 26'. The means just described and best illustrated in Fig. 4 provides for longitudinally extending or contracting the stretcher frame and enables any slack or stretch in the cover B to be compensated for. The rear windshield frame 20 is pivotally mounted at 27 and capable of being adjusted as to its angle by means of the ordinary clamping screw or connection 28.

In lieu of the arrangement shown in Fig. 4, the arrangement shown in Figs. 19, 20 and 21 may be employed in which it will be observed that the flat portions 22 of the top cross bar 29 are disposed vertically and the slots in the clamps 21 are correspondingly arranged thereby enabling the clamps to be more easily slipped over the flat portions 22 and held while the binding screws 23 are being tightened. Fig. 22 shows a car provided with three windshields, the shield 34 being located adjacent the front seat. In this form of the invention the top is formed in two sections so that only the front section may be used as shown in Fig. 23 or only the rear section as shown in Fig. 22. Each section of the top is formed with a knuckle joint so that it may be folded as shown in dotted lines in Fig. 22. The front section is connected with the front wind shield by the clamps 15 as described in the first form and the rear part of this section is connected with the middle wind shield 34 by clamps similar to that shown at 21 in Fig. 19, these clamps engaging the flat portions 22' on said wind shield 34 as shown in Fig. 27. The front end of the rear section is also provided with tongues similar to those shown at 15 in Figs. 2 and 18, and these tongues engage the holes 44 in the frame 34 of the wind shield and are held in said holes by the screws 45. The rear end of the rear section is connected with the wind shield frame 20 by the clamps 21. In Fig. 22 it will be noted that one of the top sections is provided at opposite sides with flaps 30 secured to one section and provided with buttons 31 by means of which the end portion of the flap may be secured to the other section of the top as shown in Fig. 22 or folded around the rear corners of the front section as shown in Fig. 23, when the rear section of the top is removed. The rear top section is provided with similar flaps 32 as shown in Fig. 24 so that when the front section of the top is removed, the flaps 32 previously underlying the flaps 30, may be folded around the corners and fastened by means of the buttons 31'. In this way a finished appearance is given to either the front or rear section when the remaining or complemental section is removed.

It will also be observed in Figs. 22, 23 and 24 that pockets 33 are formed in the front and rear seat backs to receive the sections of the top when removed from their useful position, said pockets being also adapted to receive the rear windshield 20 and an intermediate windshield 34. When the rear top section is removed as in Fig. 23, the front section is supported by the front and intermediate windshields and when the front section of the top is removed, the rear section thereof is supported by the intermediate and rear windshields. In a roadster body as shown in Fig. 15, it is of course necessary to provide only one pocket 33 in which to store the relatively small top 35 and the rear windshield 36 which supports the rear portion of the top.

The pocket 33 is best illustrated in Figs. 16 and 17 wherein it will be observed that each pocket is provided with depressed steps or seats 36 at the bottom thereof, and steps or hangers 37 near the top thereof, the pocket also being formed with a recess 38 to receive the clamps 21 above referred to. The pocket is provided with a cover or lid 39 hinged thereto at 40 and provided with straps 41 thereby forming a holder for the side curtains which when in their useful positions are strung upon and supported by stays 42 extending longitudinally of the machine and under the bars A of the stretcher frame, each of said stays 42 being shown as fastened at its forward end to one of the hooks or tongues 15 and at its rear end to one of the clamps 21. The stay wires 42 not only serve as supporting means for the side curtains but also serve to render the stretcher frame comparatively rigid and furthermore, when the stretcher frame is folded as shown in Fig. 30, the stays 42 which are then slack are extended back and forth across the bottom of the frame and connected to springs 43 as shown in the last named figure, the springs 43 being attached to the side bars A of the stretcher frame. The stays 42 thus operate to hold the folded top cover B in place and prevent the same from sagging.

Each of the wind shields 20 and 34 is detachably mounted on the body of the machine, as shown in Fig. 26, the lower extremities of the side arms of the windshield frame being provided with tapered extremities 49 which fit into tapered sockets 48 in brackets 50 secured to the body of the machine. Each of the side arms carries an adjusting and retaining screw 51 the inner end of which is received in a metal socket piece 52 fastened, as shown, to the body of the machine. Each of said rear and intermediate windshield frames is also formed centrally thereof with knuckle joints 53 enabling said frame to be folded into approximately one half its size before inserting the same into its respective pocket 33.

Other means for fastening the rear end of the stretcher-frame to the rear windshield 20 is shown in Figs. 28 and 29 in which it will be seen that the rear cross bar 9 of the stretcher frame is provided with loop-shaped clamps 46 which are adapted to fit over and engage lugs 47 on the top bar of said rear windshield thus providing for easily and quickly connecting and disconnecting the parts. Each of the windshields 20 and 34 is detachably mounted on the body of the machine as shown in Fig. 26, the lower extremities of the side arms of the windshield frame being provided with tapered extremities 49 which fit into tapered sockets 48 in brackets 50 secured to the body of the machine. Each of the side arms carries an adjusting and retaining screw 51 the inner end of which is received in a metal socket piece 52 fastened as shown to the body of the machine. Each of said rear and intermediate windshield frames is also formed centrally thereof with knuckle joints 53 enabling said frame to be folded into approximately one-half its size before inserting the same into its respective pocket 33.

Arm 56 shown in Figs. 6 and 7 is used for the purpose of keeping the top curtains C in a rounded contour on rear of rear windshield 20. Arm 56 is also provided with a projection 57 that fits over windshield 20 and helps hold the top in position when up. It may be thrown back out of the way as shown in dotted lines when the top or stretcher frame is put down.

The raised portion 58 shown in Fig. 20 tends to keep the top curtain C to a smooth and rounded contour when top is up.

Referring to Figs. 31 to 34, which show a modified arrangement of means for connecting the stretcher frame to the windshield and the means for supporting the windshield in its pocket, the slotted clamp, 21 is allowed to turn at 60 by pressure on the thumb piece 61 when the stretcher frame is raised a little, the slotted clamp leaves the support 62 and takes a position in between the stretcher frame in a direction as shown in dotted lines at 63 in Fig. 32. When this operation is completed the whole stretcher frame, being pivoted at 70, may be lowered so as to lie against the rear shield 20. The set screw 64 which is under the lid at the side of the pocket inside of the body is then loosened and knuckle joint 65 broken which draws the lower end of the windshield to its natural vertical position and then the same starts to slide in a downward direction in guides 66 which run from the top to the bottom of the pocket in the body on both sides, this allows both the stretcher frame and rear shield to be put away all together and covered by the lid of the pocket. The lower end of the shield is provided with two projecting lugs 67 one longer than the other which slide in the guides 66 having laterally offset sockets 69. One lug 67 of each pair is provided with a depression 68 which the adjacent set screw 64 is forced into when the shield is pulled out of the pocket and the lugs 67 are forced into sockets 69 by pulling up on straightening knuckle joint 65. When this shield is once in place and the set screw screwed down, the whole is rigid with the body of the car. The stretcher frame is then lifted and the slotted clamps 21 fall into engagement with the supports 62 thereby holding the stretcher frame in a rigid position while the operator continues the operation of setting the stretcher frame into its proper position over the whole car. If the top cover "C" gets loose, the frame formed of tubing 3 is drawn out by loosening thumb nut 26, and sliding the tubing 3 on the solid piece 25 that is fastened to the casting 21.

The top shown in Figs. 22, 23, 24, and 25 is the same as that shown in Fig. 1.

We claim:—

1. The combination with a vehicle body, comprising front and rear compartments, of a front windshield frame, a rear windshield frame, a top frame supported by said windshield frames and embodying side longitudinal bars composed of separable telescopic and adjustable sections whereby the top frame may be made longer or shorter so as to extend over the front or rear compartment or both of said compartments.

2. The combination with a vehicle body, of a front windshield frame, a rear windshield frame, a top frame supported by said windshield frame and embodying side longitudinal bars composed of separable telescopic and adjustable sections whereby the top frame may be longer or shorter, a flexible cover for said top frame adapted to be stretched by expanding said frame, and means for detachably connecting the top frame to the windshield frame.

3. The combination with a vehicle body of a front windshield frame, a rear windshield frame, a top frame supported by said windshield frame and embodying side longitudinal bars composed of separable telescopic and adjustable sections whereby the top frame may be made longer or shorter, and a flexible cover for said top frame, one of said windshields being detachable and foldable, the body being formed with a pocket to receive said windshield folded.

4. The combination with a vehicle body, of a front windshield frame, a rear detachable windshield frame, a top frame supported by said windshield frame and embodying side longitudinal bars composed of separable telescopic and adjustable sections whereby the top frame may be made longer or shorter, a flexible cover for said top frame, and a third intermediate and detachable windshield forming an additional support for the top frame, the body having pockets to receive and house said detachable windshields.

5. The combination with a vehicle body, of a front windshield frame, a rear windshield frame, a top frame supported by said windshield frame and embodying side longitudinal bars composed for separable sections whereby the top frame may be made longer or shorter, a flexible cover for said top frame, and stays connected at their former extremities to the front and rear end portions of said top frame.

6. The combination with a vehicle body, of a front windshield frame, a rear windshield frame, a top frame supported by said windshield frame and embodying side longitudinal bars composed of separable sections whereby the top frame may be made longer or shorter, and a flexible cover for said top frame, said top frame having a detachable slip joint connection with the top bars of the front and rear windshield frames.

In testimony whereof we affix our signatures in presence of two witnesses.

GARFIELD LESLIE RYDER
HARRY L. B. RYDER.

Witnesses:
LOUIS EDWIN HESS,
CHARLES VAN SCHOICK.